(12) United States Patent
Bae

(10) Patent No.: US 10,139,272 B2
(45) Date of Patent: Nov. 27, 2018

(54) COMPACT CALIBRATION AND TESTING SYSTEM FOR HIGH POWER LASERS AND OPTICS

(71) Applicant: Young Kun Bae, Corona, CA (US)

(72) Inventor: Young Kun Bae, Corona, CA (US)

(*) Notice: Subject to any disclaimer, the term of this patent is extended or adjusted under 35 U.S.C. 154(b) by 140 days.

(21) Appl. No.: 15/296,931

(22) Filed: Oct. 18, 2016

(65) Prior Publication Data
US 2018/0106669 A1    Apr. 19, 2018

(51) Int. Cl.
| | | |
|---|---|---|
| *G01J 1/42* | (2006.01) | |
| *G01M 11/00* | (2006.01) | |
| *H01S 3/06* | (2006.01) | |
| *H01S 3/042* | (2006.01) | |
| *H01S 3/04* | (2006.01) | |

(52) U.S. Cl.
CPC .......... *G01J 1/4257* (2013.01); *G01M 11/00* (2013.01); *H01S 3/0401* (2013.01); *H01S 3/042* (2013.01); *H01S 3/0405* (2013.01); *H01S 3/0604* (2013.01)

(58) Field of Classification Search
CPC ..... G01J 1/4257; G01M 11/00; H01S 3/0401; H01S 3/0405; H01S 3/042; H01S 3/0604
USPC .................................. 250/205, 559.1, 216
See application file for complete search history.

(56) References Cited

U.S. PATENT DOCUMENTS 8,327,686 B2 * 12/2012 Kachanov .......... G01N 21/1702
250/339.13

* cited by examiner

*Primary Examiner* — Que T Le
(74) *Attorney, Agent, or Firm* — Robert D. Eisler

(57) ABSTRACT

A compact high power laser calibration and testing system includes an active intracavity laser system that amplifies the laser power by recycling photons through a thin disk gain medium that is positioned between two or more highly reflective mirrors. The system is configured for calibration and testing of the high power lasers and optics that can be inserted into or positioned at the end of the intracavity. In another embodiment, the system is configured for characterization of high power laser beam propagation in operation-relevant atmospheres. The intracavity high power laser beam is configured to simulate high power laser beams with orders-of-magnitude reduced size, weight and operation power for calibrating laser powers and testing optical components. In applications that require an extra small footing or high portability, thermal management systems are configured to absorb large amounts of heat from the system for fixed time durations with the use of exchangeable cartridges made of phase change materials. The portability of the invention can be further increased and the system footing can be decreased by powering the system with disposable or rechargeable battery cartridges that can be rapidly replaced.

9 Claims, 4 Drawing Sheets

(Cross Sectional View)

(Cross Sectional View)

(Cross Sectional Detailed View of 102 through 104 in Fig. 1)

(Front and Side Planar Detailed Views of 105, 107, and 108 in Fig. 1)

COMPACT CALIBRATION AND TESTING SYSTEM FOR HIGH POWER LASERS AND OPTICS

COPYRIGHT & TRADEMARK NOTICE

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

This application claims priority from U.S. provisional patent application U.S. Ser. No. 62/255,971, filed on Nov. 16, 2015.

REFERENCES CITED

US Patent Documents

U.S. Pat. No. 4,921,041 May 1990 Akachi, H.
U.S. Pat. No. 6,307,871 October 2001 Heberle, G.
U.S. Pat. No. 6,438,152 August 2002 Contag et al.
U.S. Pat. No. 6,577,666 June 2003 Erhard et al.
U.S. Pat. No. 6,963,592 November 2005 Hounker et al.
U.S. Pat. No. 7,003,011 February 2006 Kafka et al.
U.S. Pat. No. 7,200,160 April 2007 Ludewigt, K.
U.S. Pat. No. 7,413,147 August 2008 Bae, Y.
U.S. Pat. No. 8,023,542 September 2011 Verovec, J.
U.S. Pat. No. 8,213,471 July 2012 Schlie et al.

US Patent Application Publications

2008/0197238 August 2008 Bae, Y.
2014/0307253 October 2014 Lehman et al.

Non-Patent Literatures

Bae, Y. K., "Perspective of photon propulsion for interstellar flight", Physics Procedia 38, 253-279 (2012).
Fischer et al., "Absorption and Scattering of an HEL Beam by Atmospheric Aerosols", HPLA and DE Symposium, Santa Fe, N. Mex., 2016.
Injeyan, H., "Handbook of High Power Lasers" McGraw-Hill, April 2011.
Siegman, A. E. "Lasers", University science Books, Sausalito, Calif., 1986.

TECHNICAL FIELD OF THE INVENTION

The present invention relates in general to high power laser calibration and optical component testing.

BACKGROUND OF THE INVENTION

High power lasers are extensively used in industrial and military applications, and their powers are ever increasing. The laser power levels used for industrial applications currently exceed tens of kilowatts, while the levels for military applications approach hundreds of kilowatts. In some applications, such high power lasers are used on mobile platforms. In the near future, the laser power levels are projected to exceed one megawatts. A general overview of high power laser systems and relevant technologies can be learned in a monograph entitled, "Handbook of High Power Lasers" McGraw-Hill, April 2011 by Injeyan and Goodno. Accordingly, in the existing art, these applications require laser power calibration systems and optics testing facilities that are equipped with the lasers capable of delivering such high power levels. Generating such powers is extremely costly, requires large facilities, and can be hazardous to laser operators.

Using such high power lasers for their calibration and for testing associated optics is cost inefficient, requires large facilities and hazardous. Therefore, calibration and optical testing systems of reduced cost, foot print and operation hazard have been sought for. In some applications, the high power lasers are operated on mobile platforms and need on-site characterization of high power laser propagation through atmosphere as presented in "Absorption and Scattering of an HEL Beam by Atmospheric Aerosols", HPLA and DE Symposium, Santa Fe, N. Mex., 2016 by Fischer et al. The realistic characterization of such high power lasers propagation would require full-power operation of the lasers themselves, thus can be highly costly and hazardous to operators. Therefore, high power laser characterization systems for beam propagation, which can be cost-effective and highly portable, have also been sought for.

SUMMARY OF THE INVENTION

The above and other deficiencies of the existing arts in calibration, testing and characterization systems are overcome by the present invention comprising an active intracavity laser system that amplifies the laser power by recycling photons through a thin disk gain medium that is positioned between two or more highly reflective mirrors. The intracavity high power laser beam in the present invention is configured to simulate high power laser beams with orders-of-magnitude reduced size, weight and operation power for calibrating laser powers, testing optical components and characterizing laser beam propagation. The present invention is further configured for calibration and testing of the high power lasers and optics by inserting them into or by positioning at the end of the intracavity. In the present invention, most of the laser power is contained in the system, thus the operation hazard is much less than the existing art's.

The detailed laser power amplification mechanism that employs intracavity recycling of photons and its space propulsion applications of the present invention can be found in U.S. Pat. No. 7,413,147: System and method for propellantless photon tether formation flight by Bae, US20080197238 A1: Photonic laser-based propulsion having an active intracavity thrust amplification system by Bae, and an article entitled, "Perspective of photon propulsion for interstellar flight", Physics Procedia 38, 253-279 (2012) by Bae. The existing published articles and patents related with the intracavity laser power amplification, however, fail to disclose the use of the amplification mechanism for calibration, optics testing and characterizing beam propagation as disclosed in this invention.

The use of the present invention for laser power calibration became in particular feasible owing to the recent development of the state-of-the-art laser beam power meter that measures the optical pressure on a highly reflective mirror, which is generated by reflecting the laser beam on the mirror. The laser power meter permits direct measurement of intracavity laser power without disturbing laser operation stability. The art of such pressure power meters can be learned from the US 20140307253 A1: Optical meter and use of same by Lehman et al. Such a pressure-based system is more accurate and compact, and has a faster response than the traditional thermal calorimetric power meters that measure temperature rise on the laser power absorbing materials. The disclosed laser power pressure meter, however, fail to disclose the combined use of the pressure meter with the intracavity laser power amplification mechanism that is disclosed in the present invention. Since the absorption of the highly reflective mirror on the optical pressure meters can be made extremely small, the pressure mirror can be inserted into an intracavity laser system without degrading the performance of the present invention. For realistic calibration of the pressure power meters, the present invention permits reduction in the size of the operation facility and the required laser power by orders of magnitude, and drastically enhances transportability.

The laser power amplification in the present invention occurs in the high-Q resonant intracavity formed with a thin disk gain medium that reduces absorption and scattering of laser beam through the medium. The thin disk laser (TDL) was pioneered by Giesen who demonstrated high powers and "wall plug" efficiencies better than 20% as described in a monograph entitled, "Handbook of High Power Lasers" McGraw-Hill, April 2011, by Injeyan and Goodno. The concept consisting of a lasing thin disk (TD), a hemispherical resonator having back side of thin disk serving as a flat mirror, a cooled heat sink for the TD and the laser diode pump radiation coming from a parabolic multi-pass reflector assembly was disclosed in U.S. Pat. Nos. 4,921,041; 6,438,152; 6,577,666; 6,963,592; 7,003,011; and 7,200,160. The art of thermal management of the thin disk was disclosed in U.S. Pat. No. 8,213,471. These patents and published articles, however, fail to disclose the use of the thin disk laser system for intracavity laser power amplification mechanism and the use of thin disk laser system in combination with laser pressure meter and the intracavity laser power amplification mechanism for calibration, optics testing and laser beam characterization as disclosed in the present invention.

The present invention can achieve high amplification of intracavity laser beam by factors in the range of 10-10,000 for calibration of laser power, testing optics and characterization of laser beam propagation. In doing so, the system based on the present invention requires input powers 10-10,000 times less than that based on the existing arts in laser power calibration and optics testing for high power lasers. The present system can be made highly portable and suitable for mobile applications, such as tactical military operations with high power lasers. In such applications that require an extra small footing or high portability, the thermal management systems of the present invention are configured to absorb large quantities of heat from the system for finite operation durations with the use of cartridges made of phase change materials that include paraffin, fatty acids, salt hydrates and eutectics. The use of phase change materials for thermal control of solid state laser systems can be learned from the U.S. Pat. No. 6,307,871: Laser system using phase change material for thermal control by Herberle. The heat absorbing cartridges after operation cool down by dissipating absorbed heat by flows of coolants that include water and air, or are exchanged with pre-cooled replacement cartridges. The art of combining a liquid-based cooling system with a phase change material system for efficient high power solid state laser systems can be learned from U.S. Pat. No. 8,023,542: High energy laser thermal management by Vetrovec. These patents and published articles, however, fail to disclose the use of the disclosed thermal management systems in combination with the laser pressure meter and the intracavity laser power amplification mechanism for calibration, optics testing and laser beam characterization as disclosed in the present invention. The portability of the present invention can be further increased and the system footing can be decreased by powering the system with disposable or rechargeable battery or supercapacitor cartridges that can be rapidly replaced.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE PREFERRED EMBODIMENT

Figure 1:
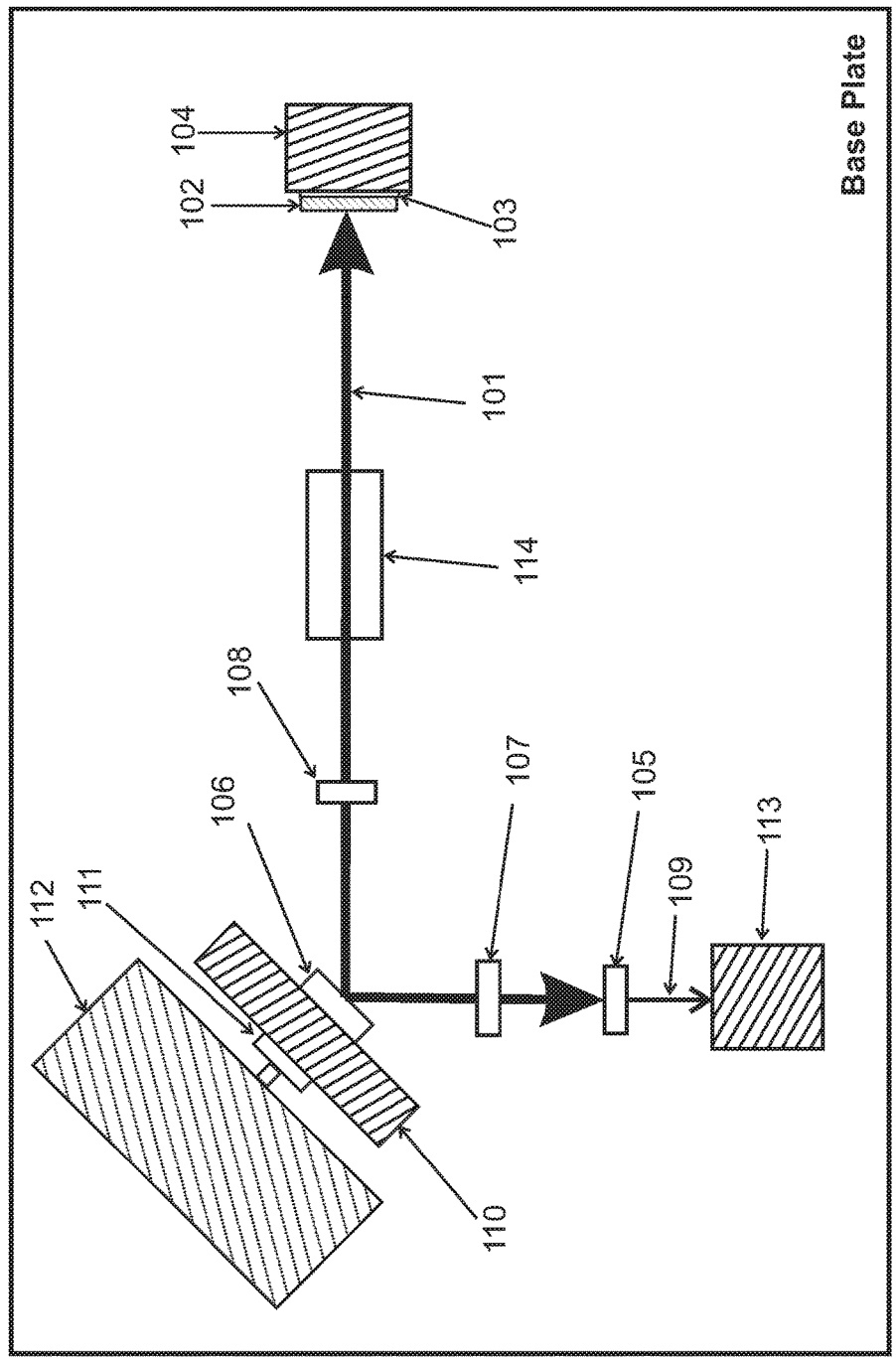
FIG. 1 illustrates schematically an overall cross sectional view of the present invention.

In the following discussion that addresses a number of embodiments and applications of the present invention, reference is made to the accompanying drawings that form a part hereof, in which is shown by way of illustration specific embodiments in which the invention may be practiced. It is to be understood that other embodiments may be utilized and changes may be made without departing from the scope of the present invention.

Recently, the use of solid state lasers with wavelengths of near infrared, on the order of one micrometer, has become popular because of their high energy efficiencies and low mechanical complexities. As the usage of such high power lasers expands, there is increasing need of calibrating the laser power, characterizing the beam propagation and testing the associated optics. The laser powers now routinely exceed 10 kilowatts and often 100 kilowatts. In the near future, the required laser powers are projected to exceed one megawatts. Generation of such laser powers requires high power consumption, complex and large facilities and safety controls, thus is highly costly. In an active intracavity that is employed in the present invention, the optical cavity is formed between two highly reflective mirrors and a gain medium positioned between the two mirrors. The intracavity laser power, $P_{int}$, which produced by recycling photons between the mirrors, is mathematically described in a monograph entitled, "Lasers", University science Books, Sausalito, Calif., 1986 by Siegman and is given by:

$$P_{int} = \frac{P_{ext}}{T'} \qquad (1)$$

where $P_{ext}$ is the maximum extractable laser power through an outcoupler mirror, when the outcoupler mirror reflectivity is optimized to maximize $P_{ext}$. Typically, $P_{ext}$ is very close to the maximum deliverable power of lasers from the optical cavity. The $P_{ext}$ can be estimated by $$P_{ext} = \frac{GI_{sat}A}{T'} \quad (2)$$

where G is the unsaturated round-trip gain factor, $I_{sat}$ is the saturation intensity of the gain medium, A is the effective lasing area in the gain medium, and T' is given by:

$$T'=T+a+s \quad (3)$$

where a is the roundtrip absorption coefficient and s is the roundtrip scattering coefficient through the gain medium, optical elements and the surfaces of mirrors. By reducing T' the intracavity laser power $P_{int}$ can be increased by orders of magnitude. For example, if T'=0.001, $P_{int}$ is 1,000 times larger than $P_{ext}$. With the state-of-art high power laser mirrors, T', which is smaller than 0.001 can be achieved. Examples of the maximum theoretical intracavity laser power as a function of the cross sectional area correlating with various laser powers with Yb:YAG crystals of $I_{sat}$~24 kW/cm$^2$, G~1, T'~0.001, are summarized in Table 1. In principle, a 1-MW intracavity laser power can be achieved by 1 kW of input power on a 0.1 cm$^2$ Yb:YAG gain medium crystal with a very small foot print. A factor of 1,000 or more reduction in power requirement and foot print permits a much smaller, safer and lighter system than the actual high power laser system for calibration and characterization. Furthermore, the high power laser is confined within the cavity, thus the leaked or scattered laser power on optical components can be greatly reduced resulting in increased operation safety.

TABLE 1

The maximum theoretical intracavity laser power based on Yb:YAG with $I_{sat}$ ~24 kW/cm$^2$, G~1, and T'~0.001. The actual achievable intracavity laser power also depends on other parameters, such as thermal management capability. The large cross sectional area of gain media can be achievable either with a single crystal or by multiplexing numbers of smaller gain media.

| Power Required Maintaining the Operation | Minimum Cross Sectional Area of Gain Medium (Yb:YAG) | Maximum Intracavity Power |
|---|---|---|
| 100 W | 0.01 cm$^2$ | 100 kW |
| 1 kW | 0.1 cm$^2$ | 1 MW |
| 10 kW | 10 cm$^2$ | 10 MW |

FIG. 1 illustrates schematically a fundamental aspect of the present invention in a cross sectional view. The intracavity laser beam, 101, produced by recycling photons generated in a thin disk gain medium, 102, between highly reflective mirrors, 103, which is mounted on a heat sink, 104. The highly reflective mirrors are dielectric mirrors. The dielectric mirror, 103, is constructed on the gain medium, 102, by coating thin dielectric films on the gain medium, 102. The gain medium, 102 and the dielectric mirror, 103, are attached to a heat sink, 104, which comprises a metal block, a semiconductor wafer, or a diamond wafer. The metal block heat sink, 104, consists of a solid block of metal, such as aluminum, beryllium or copper, or a hollow metal block, which is hollowed out and filled with a phase-change material. The semiconductor or diamond heat sink can be attached to a metal block that is hollowed out and filled with a phase change material. The phase change material comprises a material made of a single component or a combination of materials that have high heat capacities, such as paraffin, fatty acids, salt hydrates and eutectics. The heat sink block, 104, is fixed on a base plate. The intracavity laser beam, 101, is reflected on a high reflectivity mirror, 106, at an angle between 0 and 90 degrees to be directed on the outcoupler dielectric mirror, 105. The reflection of the intracavity laser beam, 101, creates a repulsive force on the mirror, 106. The repulsive force is transmitted through a heat sink, 110 and a pedestal, 111, to and measured by a radiation pressure meter, 112. The heat sink, 110, consists of a solid block of metal, such as aluminum or copper, or a hollow metal block, which is filled with a phase change material. The phase change material comprises a material of a single component or a combination of materials that have high heat capacities, such as paraffin, fatty acids, salt hydrates and eutectics. All these elements are mounted on the base plate that is detailed in the later section.

By measuring the power, W, of the laser beam, 109, transmitted through the outcoupler mirror, 105, on a laser power meter, 113, and with a known transmittance, T, of the outcoupler mirror, 105, the intracavity laser power $P_{int}$ is accurately determined with:

$$P_{int} = \frac{W}{T}. \quad (4)$$

If the transmittance, T, of the outcoupler, 105, is 0.0005, for example, and $P_{int}$ is 500 kW, the registered laser power on the radiation power meter, 113 should be 250 W. Once $P_{int}$ is determined, calibration of the radiation pressure meter, 112, can performed. For example, if the angle between the front surface of the dielectric mirror, 106, and the intracavity beam, 101, is positioned at 45 degree and if the intracavity laser beam power is 500 kW, the force registered on the radiation pressure meter, 112, should be 4.71 mN or 0.481 gram in weight. Conversely, if the calibration of the radiation pressure meter, 112, is well established, it can be used to calibrate and test the transmittance of the outcoupler mirror, 105, accurately. Similar calibration can be performed on an optical component, 107 or 108, which can be positioned within the intracavity. The component includes a mirror, a lens, and a beam splitter. The insertion of the optical component, 107 or 108, changes the intracavity laser power registered on the radiation pressure meter, 112, and the power of the transmitted laser beam, 109, registered on a laser power meter, 113. With the use of these changes, the transmittance and reflectance of the optical component, 107 or 108, can be calibrated with the use of Eqn. 2 and Eqn. 3 to high precision.

The present invention can be also used for characterizing atmospheric propagation of the high power laser beam by exposing the system directly to an operation atmosphere or to a sample of the operation atmosphere in a form of flow or jet into the intracavity laser beam, 101, or in a tube, 114, with or without end windows that have anti-reflectance coating. By measuring the change in intracavity laser power between without and with the operational atmosphere or its sample, the absorption and scattering through the operation atmosphere are measured. The importance and the art of such measurements can be found in a presentation entitled, "Absorption and Scattering of an HEL Beam by Atmospheric Aerosols", HPLA and DE Symposium, Santa Fe, N. Mex., 2016 by Fischer et al. The present art, however, fail to disclose the use of intracavity amplification systems as disclosed in the present invention.

The present invention can be used for testing the damage threshold an optical component, 105, 106, 107, or 108. The tested optical components include a mirror, a lens and a beam splitter. For example, in a damage threshold test, the intracavity laser power, $P_{int}$, is ramped up slowly from a low power until the damage on the optical component, 105, 106, 107, or 108, occurs. Any serious damage on the components would immediately lower the intracavity power by orders of magnitude. In particular, a highly reflective mirror optimized to a laser reflection angles between 0 and 90 degrees can be positioned for calibration and testing at the position of 106. The maximum value of this test can be used as a damage threshold. For example, with T' of 0.001 and the cross sectional area of the intracavity laser beam, 101, of 0.5 cm$^2$, the damage threshold of 1 megawatts per square centimeter can be measured with $P_{int}$=0.5 megawatts. The extractable laser power, $P_{ext}$, is 500 watts. Therefore, the testing laser system operates as a 500 W laser system rather than a 500 kilowatts system.

Figure 2:
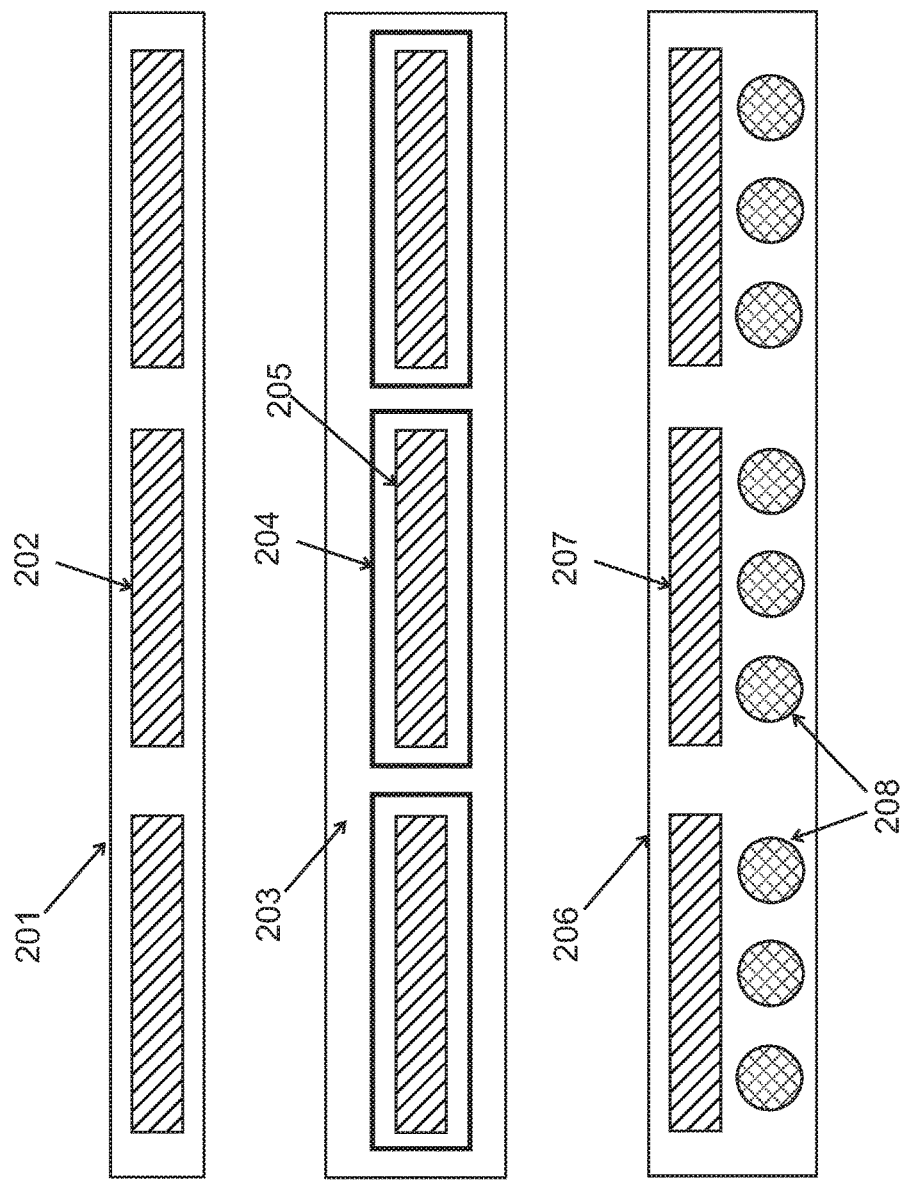
FIG. 2 illustrates schematically detailed cross sectional views of three examples of the base plate shown in FIG. 1.

FIG. 2 illustrates schematically of cross sectional views of representative examples of the base plate that is used for mounting the laser and optical components in FIG. 1. The base plate, 201, can be made of a solid block of metals that include aluminum, copper or alloys. In an embodiment, the base plate, 201, can be hollowed out to fill phase change materials, 202, that include paraffin, fatty acids, salt hydrates and eutectics. In this embodiment, the base plate can be cooled by air flows that can be provided by various means that includes a fan during or after the laser operation. In another embodiment, the base plate, 203, can be hollowed out to accept removable or exchangeable cartridges, 204, that contain phase change materials, 205, that include paraffin, fatty acids, salt hydrates and eutectics. In this embodiment, once heated up, the cartridges, 204, can be rapidly exchanged with pre-cooled cartridges. Yet in another embodiment, the base plate, 206, can be hollowed out to fill phase change materials that include paraffin, fatty acids, salt hydrates and eutectics, and to have flow of liquid coolants, 208, that include water, Freon and ammonia. In this embodiment, once heated up the whole components of the base plate can be rapidly cooled by the flow of coolants.

Figure 3:
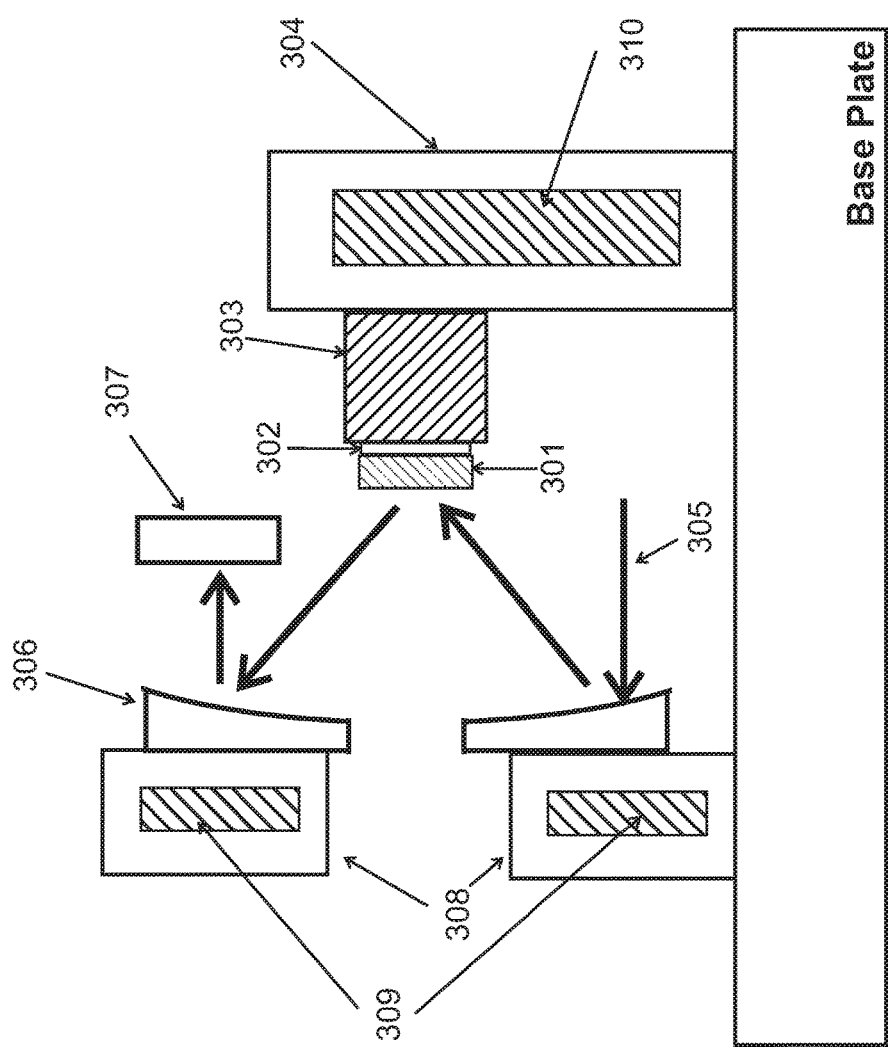
FIG. 3 illustrates a detailed cross sectional view of the thin disk laser components in FIG. 1.

FIG. 3 illustrates schematically the detailed cross sectional view of the thin disk gain medium area that includes components, 102 through 104 of FIG. 1. The thin disk gain medium, 301, the highly reflective mirror or coating, 302, and the heat sink, 303, are attached to a thermally conducting metal block support, 304, that is in turn mounted on the base plate. The metal block support, 304, can be made of a solid block of metals that include aluminum, copper or alloys. In an embodiment, the support, 304, can be hollowed out to fill phase change materials, 310, that include paraffin, fatty acids, salt hydrates and eutectics. In another embodiment, the support, 304, can contain flows or jets of coolants, 310, that include water, Freon and ammonia in separate hollows that are not explicitly shown in FIG. 3. Yet in another embodiment, the support, 304, can contain both phase change materials that include paraffin, fatty acids, salt hydrates and eutectics, and flows or jets of coolants, 310, that include water, Freon and ammonia in separate hollows that are not explicitly shown in FIG. 3 for simplicity. The thin disk is optically pumped by another laser beam, 305, which bounces multiple times between the parabolic mirror, 306, and the end mirror, 307. These optical components. 306, 307, are mounted on a thermally conducting metal support, 308, that is in turn mounted on the base plate. In an embodiment, the support, 308, can be hollowed out to fill phase change materials, 309, that include paraffin, fatty acids, salt hydrates and eutectics. In another embodiment, the support, 308, can contain flows or jets of coolants, 309, that include water, Freon and ammonia. Yet in another embodiment, the support, 308, can contain both phase change materials that include paraffin, fatty acids, salt hydrates and eutectics, and flows or jets of coolants, 309, that include water, Freon and ammonia in separate hollows that are not explicitly shown in FIG. 3 for simplicity.

Figure 4:
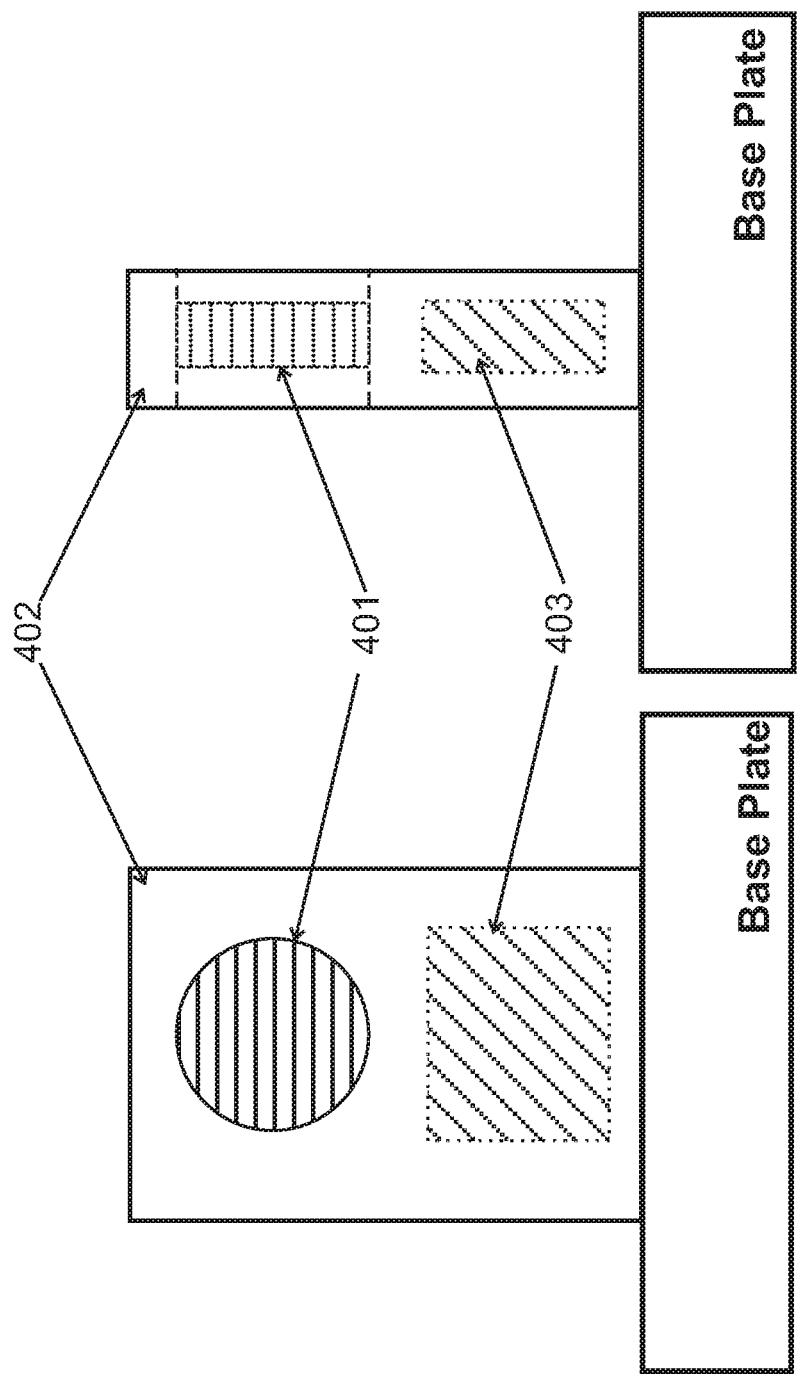
FIG. 4 illustrates schematically detailed front and side planar views of the holders of optical components in FIG. 1.

FIG. 4 illustrates schematically the front and side planar views of optics mounts, 105, 107 and 108, in FIG. 1, that are in turn mounted on the base plate. The metal block mount, 402, holds and transmits the heat generated on an optical component, 401, that includes, a mirror, a lens, and a beam splitter. The metal block mount, 402, can be made of a solid block of metals that include aluminum, copper or alloys. In an embodiment, the mount, 402, can be hollowed out to fill phase change materials, 403, that include paraffin, fatty acids, salt hydrates and eutectics. In another embodiment, the mount, 402, can contain flows or jets of coolants, 403, that include water, Freon and ammonia. Yet in another embodiment, the mount, 402, can contain both phase change materials that include paraffin, fatty acids, salt hydrates and eutectics, and flows or jets of coolants, 403, that include water, Freon and ammonia in separate hollows that are not explicitly shown in FIG. 4 for simplicity.

What is claimed is:

1. An optical calibration and testing system comprising:
   (a) an intracavity laser beam in which a laser beam is recycled plural times; and
   (b) a thin disk laser head to generate and maintain the intracavity laser beam comprising:
      a thin disk gain medium that generates laser power, and
      a high reflectance mirror either coated or attached on the gain medium, and
      a heat sink comprising:
         a solid metal block comprising aluminum, copper, beryllium or their alloys, or
         a semiconductor wafer that is attached to a solid or hollowed-out metal block, or
         a diamond wafer that is attached to a solid or hollowed-out metal block,
         wherein the hollowed-out metal block filled with a phase change material comprising paraffin, fatty acids, salt hydrates, eutectics or any combination of these materials,
      wherein the heat sink is attached to a common base plate comprising:
         a solid metal bock, or
         a hollowed-out metal block filled with a phase change material comprising:
            paraffin, fatty acids, salt hydrates, eutectics or any combination of these materials, or
         a hollowed-out metal block filled with flow of liquid coolant comprising:
            water, Freon, or ammonia, or
         a hollowed-out metal block filled with replacement cartridges comprising;
            hollowed-out metal block filled with a phase change material comprising paraffin, fatty acids, salt hydrates, eutectics or any combination of these materials; and
   (c) a radiation pressure meter system comprising:
      a high reflectance mirror positioned at an angle between 0 and 90 degrees to the direction of the intracavity laser beam, wherein the reflection of the intracavity laser beam creates a repulsive force on the mirror,
wherein the high reflectance mirror is attached to a heat sink comprising:
a solid metal bock, or
a hollowed-out metal block filled with a phase change material comprising:
paraffin, fatty acids, salt hydrates, eutectics or any combination of these materials, or
a hollowed-out metal block filled with flow of liquid coolant comprising water, Freon, or ammonia, or
a hollowed-out metal block filled with replacement cartridges comprising;
hollowed-out metal block filled with a phase change material comprising paraffin, fatty acids, salt hydrates, eutectics or any combination of these materials,
wherein the heat sink is attached to a radiation pressure meter that reads the repulsive force from the reflection of the intracavity laser beam on the mirror, which is transmitted through the heat sink to the meter,
wherein the radiation pressure meter is attached to the base plate; and
(d) an outcoupler high reflectance mirror that terminates the intracavity laser beam and is mounted on a heat sink comprising:
a solid metal bock, or
a hollowed-out metal block filled with a phase change material comprising:
paraffin, fatty acids, salt hydrates, eutectics or any combination of these materials, or
a hollowed-out metal block filled with flow liquid coolant comprising water, Freon, or ammonia, or
a hollowed-out metal block filled with replacement cartridges comprising;
hollowed metal block filled with a phase change material comprising paraffin, fatty acids, salt hydrates, eutectics or any combination of these materials,
wherein the heat sink is attached the base plate; and
(e) a tested or calibrated optical element that is positioned in the intracavity beam, and mounted on a heat sink comprising:
a solid metal bock, or
a hollowed-out metal block filled with a phase change material comprising:
paraffin, fatty acids, salt hydrates, eutectics or any combination of these materials, or
a hollowed-out metal block filled with flow liquid coolant comprising water, Freon, or ammonia, or
a hollowed-out metal block filled with replacement cartridges comprising;
hollowed metal block filled with a phase change material comprising paraffin, fatty acids, salt hydrates, eutectics or any combination of these materials,
wherein the heat sink is attached the base plate.

2. The optical calibration and testing system of claim 1, wherein the intracavity laser power is from 1 milliwatts (mW) to 1,000 gigawatts (GW).

3. The optical calibration and testing system of claim 1, wherein the intracavity laser wavelength is from 100 nm to 100 μm.

4. The optical calibration and testing system of claim 1, wherein the intracavity laser force on the pressure meter is greater than or equal to 1 nano-Newtons (nN).

5. The optical calibration and testing system of claim 1, wherein the cross sectional diameter of the intracavity laser beam is greater than or equal to 0.1 mm.

6. The optical calibration and testing system of claim 1, wherein the testing optical element is one of any mirrors comprising the outcoupler mirror, the high reflectance mirror attached on the radiation pressure meter or the thin disk laser head.

7. The optical testing and calibration system in claim 1, wherein the tested element is any of heat sinks in claim 1.

8. The optical testing and calibration system in claim 1, wherein its powering system comprising:
a conventional wall-plug power, or
a portable power generator, or
disposable or rechargeable batteries, or
supercapacitor cartridges, or
any combinations of the above elements.

9. A process of characterizing laser beam propagation in atmosphere, the process comprising:
exposing the system in claim 1 directly to the operational atmosphere; or
passing the intracavity through a jet or flow of a sample of the operational atmosphere; or
passing the intracavity through a tube that contains a sample of the operational atmosphere,
wherein the tube is open, fully or partially closed with one or more optical windows with anti-reflectance (AR) coating.

* * * * *